(12) United States Patent
Hildenbrand et al.

(10) Patent No.: US 8,935,205 B2
(45) Date of Patent: Jan. 13, 2015

(54) SYSTEM AND METHOD OF PERFORMING SNAPSHOT ISOLATION IN DISTRIBUTED DATABASES

(75) Inventors: Stefan Hildenbrand, Altdorf (CH); Carsten Binnig, Neckarburken (DE); Franz Faerber, Walldorf (DE); Donald Kossmann, Zurich (CH); Juchang Lee, Seoul (KR); Norman May, Karlsruhe (DE)

(73) Assignee: SAP AG, Walldorf (DE)

( * ) Notice: Subject to any disclaimer, the term of this patent is extended or adjusted under 35 U.S.C. 154(b) by 153 days.

(21) Appl. No.: 13/298,048

(22) Filed: Nov. 16, 2011

(65) Prior Publication Data
US 2013/0124475 A1 May 16, 2013

(51) Int. Cl.
*G06F 17/30* (2006.01)

(52) U.S. Cl.
CPC ............... *G06F 17/30351* (2013.01)
USPC .......................... 707/636; 707/770

(58) Field of Classification Search
USPC .................................. 707/636, 770
See application file for complete search history.

(56) References Cited

U.S. PATENT DOCUMENTS

| 8,126,892 | B2* | 2/2012 | Chakravarthy et al. | 707/736 |
| 2003/0088588 | A1* | 5/2003 | Cabrera et al. | 707/201 |
| 2013/0117307 | A1* | 5/2013 | Vishnoi et al. | 707/770 |

OTHER PUBLICATIONS

J. E. Armendariz-Inigo et al., "A formal characterization of SI-based ROWA replication protocols." Data Knowl. Eng., 70:21-34, Jan. 2011.
J. E. Armendariz-Inigo et al., "SIPRe: a partial database replication protocol with SI replicas." In Proceedings of the 2008 ACM symposium on Applied computing, pp. 2181-2185. 2008.
H. Berenson et al., "A critique of ANSI SQL isolation levels." in SIGMOD, pp. 1-10. 1995.
P. A. Bernstein et al., "Adapting microsoft SQL server for cloud computing." In ICDE, pp. 1255-1263. 2011.
P. A. Bernstein et al., "Concurrency Control and Recovery in Database Systems." Addison-Wesley. pp. 143-166. 1987.
M. A. Bornea et al. "One-copy serializability with snapshot isolation under the hood." In ICDE, pp. 625-636, 2011.
L. Carnargos et al., "Sprint: a middleware for high-performance transaction processing" in EuroSys, pp. 385-398. 2007.
C. Curino et al. ". Schism: a workload-driven approach to database replication and partitioning." Proc. VLDB Endow., 3:48-57, Sep. 2010.
S. Das, et al. "ElasTraS: an elastic transactional data store in the cloud." in HotCloud, 2009.
K. Daudjee et al. "Lazy database replication with snapshot isolation." In VLDB, pp. 715-726, 2006.
S. Elnikety et al. "Database Replication Using Generalized Snapshot Isolation." In Proceedings of the 24th IEEE Symposium on Reliable Distributed Systems, pp. 73-84, 2005.
U. J. Fritzke et al. "Transactions on Partially Replicated Data based on Reliable and Atomic Multicasts." ICDCS, p. 0284, 2001.

(Continued)

*Primary Examiner* — Belix M Ortiz Ditren
(74) *Attorney, Agent, or Firm* — Fountainhead Law Group PC

(57) ABSTRACT

A system and method of performing snapshot isolation in distributed databases. Each node stores local snapshot information that enforces snapshot isolation for that node. The method includes partially processing a distributed transaction by a first node, receiving a global commit identifier from a coordinator, and continuing to process the distributed transaction, by the first node and a second node, in accordance with the global commit identifier.

19 Claims, 7 Drawing Sheets

(56) References Cited

OTHER PUBLICATIONS

J. Holliday et al. "Partial Database Replication using Epidemic Communication." In ICDCS, pp. 485-, 2002.

E. P. Jones et al. "Low overhead concurrency control for partitioned main memory databases." In SIGMOD, pp. 603-614, 2010.

H. Jung et al. "Serializable Snapshot Isolation for Replicated Databases in High-Update Scenarios." In VLDB, 2011.

Y. Lin et al. "Snapshot isolation and integrity constraints in replicated databases." ACM Trans. Database Syst., 34:11:1-11:49, Jul. 2009.

Y. Lin et al. "Middleware based data replication providing snapshot isolation." In SIGMOD, pp. 419-430, 2005.

D. B. Lomet et al. "Unbundling Transaction Services in the Cloud." In CIDR. www.crdrdb.org, 2009.

Oracle Corporation. Oracle Database Concepts, 11g Release 2 (11.2), Chapter 10—Transactions. 2011.

J. K. Ousterhout et al. "The case for RAMCloud." Commun. ACM, 54(7):121-30, 2011.

C. Plattner and G. Alonso. "Ganymed: scalable replication for transactional web applications." In Middleware, pp. 155-174, 2004.

R. Schenkel et al. Federated Transaction Management with Snapshot Isolation. In Selected papers from the Eight International Workshop on Foundations of Models and Languages for Data and Objects, Transactions and Database Dynamics, pp. 1-25, 2000.

D. Serrano et al. "Boosting Database Replication Scalability through Partial Replication and 1-Copy-Snapshot-Isolation." In Proceedings of the 13th Pacific Rim International Symposium on Dependable Computing, pp. 290-297, 2007.

Transaction Processing Performance Council. TPC Benchmark C, revision 5.11, 2010.

C. Zhang and H. de Sterck, "Supporting multi-row distributed transactions with global snapshot isolation using bare-bones HBase." in GRID, pp. 177-184, Oct. 2010.

C. Zhang and H. de Sterck, "HBaseSI: Multi-Row Distributed Transactions with Global String Snapshot Isolation on Clouds." Scalable Computing: Practice and Experience, 12, 2011.

C. Plattner, Andreas Wapf, and Gustavo Alonso, "Searching in Time," SIGMOD 2006, Jun. 27-29, 2006., p. 754-756.

Ralf Schenkel, et al.; "Federated Transaction Management with Snapshot Isolation" in "Transactions and Database Dynamics"; 2000; Springer Berlin Heidelberg, Berlin; vol. 1773, 20 pages.

Ramez Elmasri, et al.; "Fundamentals of Database Systems"; 2010; Sixth Edition, Chapter 25; Addison-Wesley; 54 pages.

Extended European Search Report mailed May 9, 2014 in European Patent Application No. 12-006-286.4-1952; 9 pages.

* cited by examiner

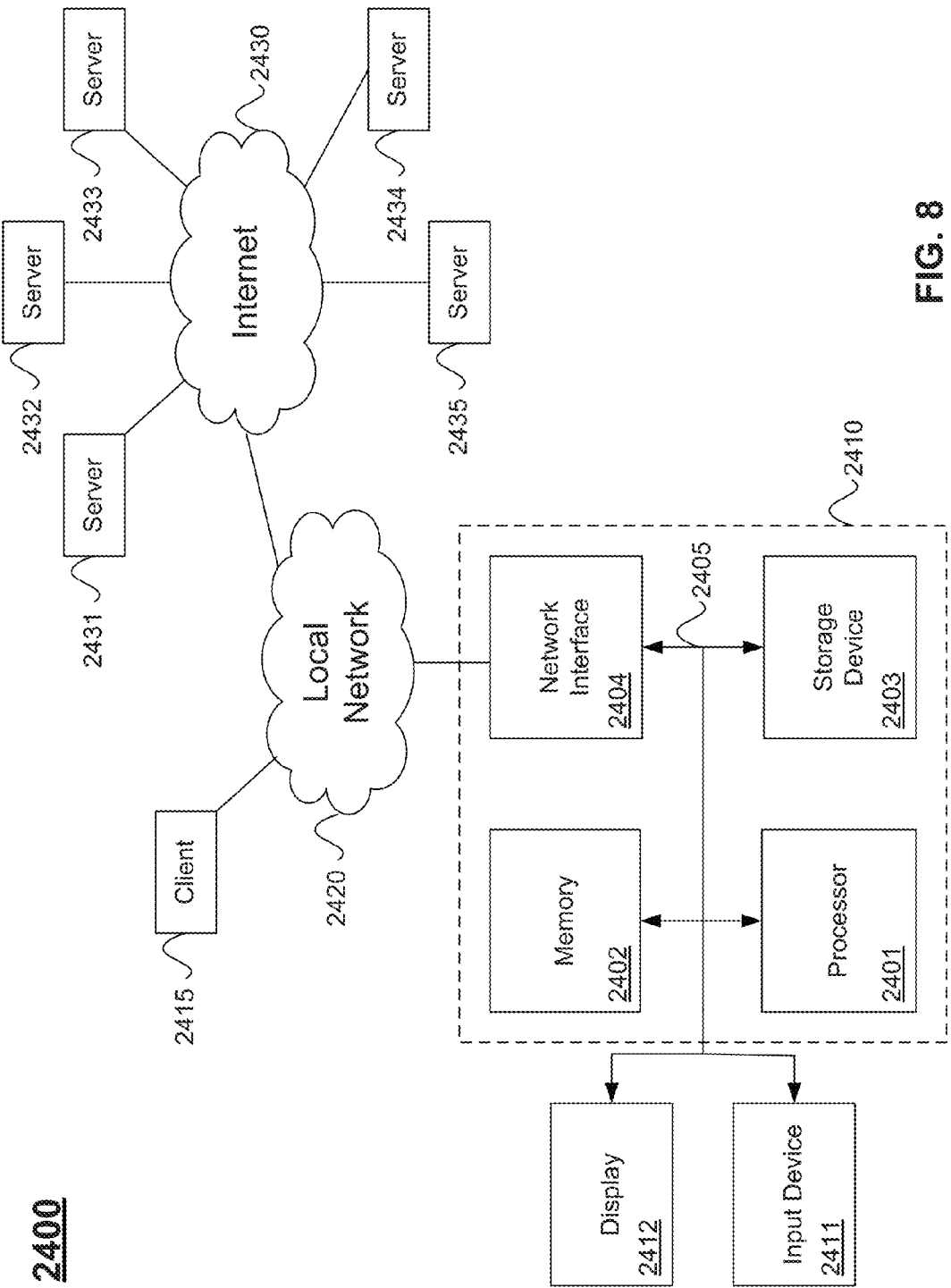

SYSTEM AND METHOD OF PERFORMING SNAPSHOT ISOLATION IN DISTRIBUTED DATABASES

CROSS REFERENCE TO RELATED APPLICATIONS

Not applicable.

BACKGROUND

1. Field of the Invention

The present invention relates to databases, and in particular, to snapshot isolation in distributed databases.

2. Description of the Related Art

Unless otherwise indicated herein, the approaches described in this section are not prior art to the claims in this application and are not admitted to be prior art by inclusion in this section.

Snapshot isolation is emerging as the de-facto standard for concurrency control in most modern database systems. Almost all commercial database systems support it. Many open source database systems use it, too. Snapshot isolation allows certain non-serializable schedules, but this caveat seems to be tolerable for most applications. On the positive side, snapshot isolation can be implemented efficiently to enable a high transaction throughput. Furthermore, snapshot isolation allows to execute read-only transactions in a non-blocking way which is important for so-called operational BI workloads which involve long-running decision support queries on transacted data.

While snapshot isolation is well understood for centralized database systems, it has not been explored much for distributed database systems in which a transaction may read and update data items from multiple nodes. Obviously, such distributed database systems are becoming increasingly important with the emerging trend to deploy databases in the cloud and to keep all data in main memory. For in-memory database systems, for instance, distributed snapshot isolation is useful because a database may not fit into the main memory of a single machine, but it is likely to fit into the aggregate main memory provided by a cluster of machines.

One commercial database system that supports distributed snapshot isolation is Oracle (e.g., Oracle Database 11g Release 2). Unfortunately, Oracle has published no details of the implementation and isolation properties. In the academic community, distributed snapshot isolation has been discussed (mainly in the context of federated databases) in R. Schenkel, G. Weikum, N. Weissenberg, and X. Wu, Federated Transaction Management with Snapshot Isolation, in Selected papers from the Eight International Workshop on Foundations of Models and Languages for Data and Objects, Transactions and Database Dynamics, pages 1-25 (2000) [hereafter "Schenkel"]. In Schenkel, the databases are treated as black boxes and local transactions are not considered.

Three general approaches to distributed snapshot isolation are the global approach, the pessimistic approach, and the optimistic approach. These are briefly described below, and details can be found in Schenkel.

In order to provide a consistent snapshot for those transactions that access more than one node, current systems (e.g. the commercial database we are working with) require all transactions to be coordinated. We call this approach global, since the coordination is effected using a (conceptually) centralized coordinator that issues globally valid snapshots. This works as follows: a new transaction x requests a globally valid snapshot from the central coordinator on its begin-of-transaction. The coordinator is the only one to enumerate the snapshots, thus it can issue such a snapshot without contacting the local nodes. With the information from the coordinator, the transaction x can access the local nodes which do not issue their own snapshots but directly use the information from the coordinator. To commit, the system runs an atomic commit protocol (e.g. two phase commit) with all participating nodes including the coordinator. This way, the coordinator is aware of all commits and can provide new transactions with the proper snapshot information. The advantages of the global approach are its simplicity and viability in all scenarios.

The pessimistic approach differs in one important aspect from the global approach: the central coordinator does not produce globally valid snapshots on its own but contacts the local nodes to coordinate the setup of a distributed snapshot. This means that only the distributed transactions need to contact the central coordinator but the overhead to begin a distributed transaction is increased. The approach requires that the system knows in advance which transactions are distributed and which nodes the transaction will access. This is because the coordinator will only contact the minimal set of nodes to set up the distributed snapshot for performance reasons. We call this requirement full a-priori knowledge. If the set of accessed nodes is not known, a conservative set of candidates has to be used which limits performance. The begin and commit operations of all distributed transactions are synchronized by the central coordinator. Thus, while the coordinator prepares the distributed snapshot for transaction x, no other distributed transaction may begin or commit. The coordinator constructs the distributed snapshot by issuing begin-of-transaction operations on each local node. The transaction can then access the nodes using the prepared transaction context. To commit, the system runs an atomic commit protocol synchronized by the coordinator. The advantage of the pessimistic approach is that local transactions do not interact with the central coordinator which improves performance if most transactions are local. An example of the pessimistic approach builds a partial database replication protocol, i.e. on begin of a transaction, all potentially involved nodes are informed. See J. E. Armendariz-Inigo, A. Mauch-Goya, J. R. Gonzalez de Mendivil, and F. D. Munoz Escoi, SIPRe: a partial database replication protocol with SI replicas, in Proceedings of the 2008 ACM symposium on Applied Computing, pages 2181-2185 (2008).

In order to get rid of the requirement of full a-priori knowledge, an approach called optimistic may be used. The basic idea is to let the transactions run without coordination except for an atomic commit protocol that synchronizes the commits of distributed transactions. At commit time, the system detects whether a potential anomaly occurred. This can be realized by keeping track of the relative order of the begin and commit operations of the distributed transactions on a central coordinator. With this approach, no exact a-priori knowledge is required. However, the performance can be improved if the system knows in advance which transactions will become distributed since then the book keeping can be restricted to distributed transactions. The algorithm rejects one of any two concurrent transactions if there exists a node that is not accessed by both of the transactions. The advantage of the optimistic approach is that it does not require full a-priori knowledge but still allows local transactions to only interact with their local node. Furthermore the overhead of enforcing distributed snapshot isolation is only paid for transactions that want to commit.

In generalized snapshot isolation, the begin of the transaction (i.e. the snapshot) is separated from the first actual operation. See S. Elnikety, W. Zwaenepoel, and F. Pedone, Database Replication Using Generalized Snapshot Isolation, in Proceedings of the 24th IEEE Symposium on Reliable Distributed Systems, pages 73-84 (2005) [hereafter "Elnikety"]. The begin may only be earlier than the first actual operation.

A system ensures session snapshot isolation if consecutive transactions of the same client (i.e. the same session) see what previous transactions wrote and snapshot isolation holds. See K. Daudjee and K. Salem, Lazy database replication with snapshot isolation, in VLDB, pages 715-726 (2006) [hereafter "Daudjee"]. This definition is useful since normal snapshot isolation does not require that a client gets the most recent snapshot. Daudjee calls it strong snapshot isolation if every transaction gets the most recent snapshot.

Snapshot isolation has been performed on column store databases. See C. Zhang and H. de Sterck, Supporting multi-row distributed transactions with global snapshot isolation using bare-bones HBase, in GRID, pages 177-184 (October 2010) [hereafter "Zhang 1"]; and C. Zhang and H. de Sterck, HBaseSI: Multi-Row Distributed Transactions with Global String Snapshot Isolation on Clouds, in Scalable Computing: Practice and Experience, 12 (2011) [hereafter "Zhang 2"]. This approach is similar to the global approach, since all information about transactions is kept in a bunch of (conceptually) centralized tables.

A system opens dummy transactions after each commit that can then later be used to process requests from other nodes that need an older snapshot. See D. Serrano, M. Patino-Martinez, R. Jimenez-Peris, and B. Kemme, Boosting Database Replication Scalability through Partial Replication and 1-Copy-Snapshot-Isolation, in Proceedings of the 13th Pacific Rim International Symposium on Dependable Computing, pages 290-297 (2007). In this system, in order to keep the nodes synchronized, they use group communication to commit all transactions on all nodes.

SUMMARY

Given the above background, there is a need for improvements regarding snapshots in distributed databases. An embodiment of the present invention is directed toward incremental snapshot isolation for distributed databases.

Described herein is an approach for snapshot isolation in distributed databases called incremental. Compared to existing approaches, incremental requires less knowledge about the workload while providing the same or better consistency guarantees than existing approaches. Furthermore, performance experiments show that the incremental approach provides scalability with the number of nodes.

The incremental technique is particularly attractive in two situations. First, if most transactions involve only a single node. This situation arises if the database can be partitioned reasonably well (i.e. sharding). For instance, the TPC-C benchmark models an application in which customers order products that are in stock at different warehouses. Many transactions of the TPC-C benchmark involve only products that are in stock at one single warehouse. So, if each node represents one warehouse, then many transactions hit only a single node and only few transactions involve more than one node. The beauty of the incremental technique is that such local transactions are executed as efficiently as in a traditional centralized database system. The cost for global synchronization needs to be paid only by transactions that actually do access data from multiple nodes.

A second advantage of the incremental technique is that it requires no a-priori knowledge of which nodes a transaction accesses. This property is critical in order to maintain transparency and data independence in a distributed database system. In contrast, the techniques discussed in Schenkel, as understood, only show good performance if it is known a-priori which nodes a transaction is going to access.

One embodiment is a method of performing snapshot isolation in distributed databases. The method includes implementing, on hardware devices, nodes that implement a distributed database. The method further includes storing, by the nodes, local snapshot information, where for a particular node a corresponding local snapshot information enforces snapshot isolation for the particular node. The method further includes partially processing, by a first node, a distributed transaction. The method further includes sending, by the first node to a hardware coordinator, a request to access a second node. The method further includes receiving, by the first node from the hardware coordinator, a global commit identifier. The method further includes continuing to process the distributed transaction, by the first node and the second node, in accordance with the global commit identifier. In this manner, the appropriate snapshot is selected to perform the transaction.

One of the hardware devices may be configured to implement at least two of the nodes. One of the hardware devices may be configured to implement one of the nodes. Each of the nodes may store a different part of the distributed database.

The global commit identifier may be one of many global commit identifiers. Each of the global commit identifiers may identify a commit of each one of many distributed transactions. The hardware coordinator may generate the global commit identifier. The hardware coordinator may generate the global commit identifier when one of many distributed transactions commits successfully. The hardware coordinator may generate many global commit identifiers when many distributed transactions commit successfully.

The first node may check that another distributed transaction has not committed, prior to sending the request.

The first node may check that another distributed transaction has not committed, prior to continuing to process the distributed transaction.

Continuing to process the distributed transaction may include checking, by the first node, that another distributed transaction has not committed; transmitting, from the first node to the second node, the global commit identifier; and processing the distributed transaction, by the second node, according to a snapshot of the local snapshot information on the second node that was made prior to the global commit identifier.

The local snapshot information may correspond to many snapshots of the distributed database on the nodes.

The local snapshot information may corresponds to many snapshots of the distributed database that are created incrementally on the nodes.

A computer system may operate to implement the method described above. The computer system may store, execute or be otherwise controlled by one or more computer programs that control the computer system to implement the method described above.

A non-transitory computer readable medium may store instructions to control a computer system to perform the method described above. The instructions may include a distributed database component and a coordinator component. The distributed database component and the coordinator component may control hardware devices and a hardware coordinator to implement the method described above.

The following detailed description and accompanying drawings provide a better understanding of the nature and advantages of the present invention.

BRIEF DESCRIPTION OF THE DRAWINGS

FIG. 8 is a block diagram of an example computer system and network 2400 for implementing embodiments of the present invention.

DETAILED DESCRIPTION

1. Introduction

Described herein are techniques for snapshot isolation in distributed databases. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step only when the first step must be completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

In this document, various computer-implemented methods, processes and procedures are described. It is to be understood that the various actions (receiving, storing, sending, communicating, displaying, etc.) are performed by a hardware device, even if the action may be authorized, initiated or triggered by a user, or even if the hardware device is controlled by a computer program, software, firmware, etc. Further, it is to be understood that the hardware device is operating on data, even if the data may represent concepts or real-world objects, thus the explicit labeling as "data" as such is omitted. For example, when the hardware device is described as "storing a record", it is to be understood that the hardware device is storing data that represents the record.

2. Problem Statement

This section presents the client-server architecture used for our system. Furthermore, we introduce required basics and present the anomalies that can occur in distributed snapshot isolation followed by a set of correctness criteria that are sufficient to enforce schedules that do not suffer from the presented anomalies.

2.1 Architecture

Figure 1:
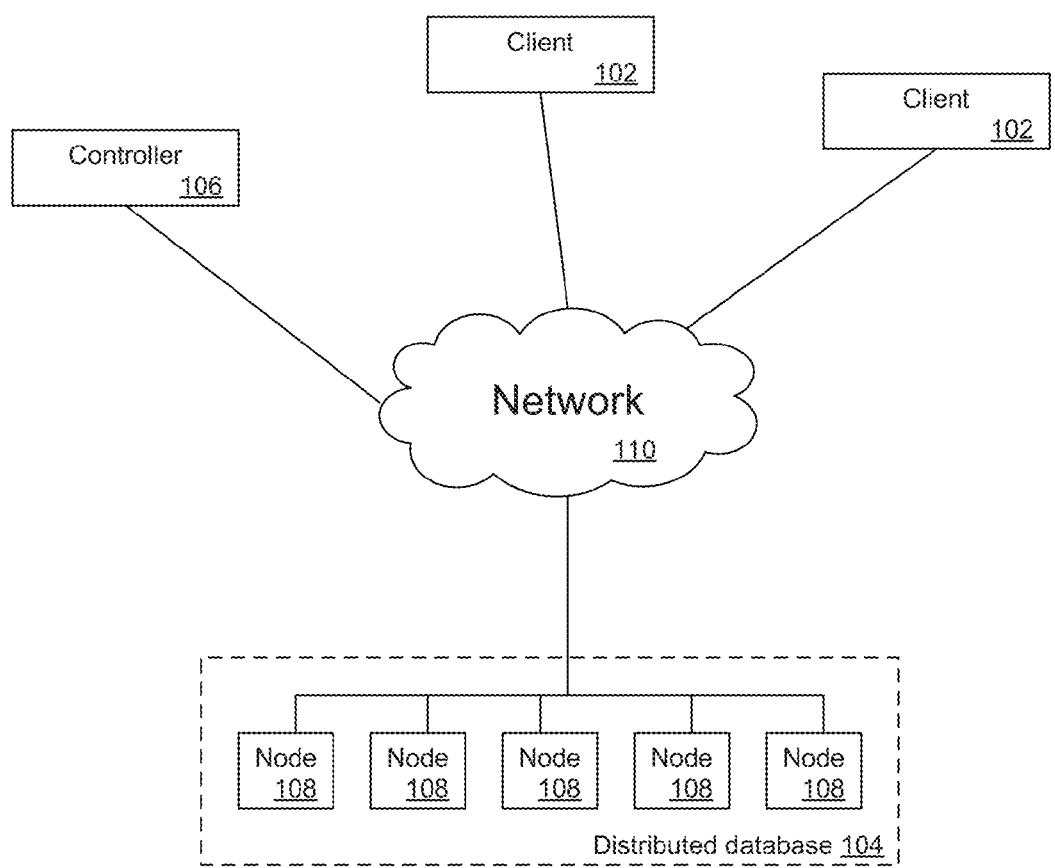
FIG. 1 is a block diagram of a system for incremental snapshot isolation.

The general system architecture is a distributed database that implements snapshot isolation. The architecture of the system 100 is shown in FIG. 1. Several clients 102 access the system 100. The system 100 includes the database 104 and a central coordinator 106. (The system 100 also includes other components (not shown) that perform functions such as transaction processing, transaction management, transaction coordination, etc. as further discussed below; these components may be implemented with the central coordinator 106 by one or more hardware computers.) Distributed means that the database 104 is hosted on multiple nodes 108 which can be virtually or physically separated. The system 100 has full control over all nodes and is able to implement new protocols within those nodes. This is in contrast to a federated system (e.g., as used in Schenkel as understood) in which the nodes operate autonomously and cannot be changed. A network 110 connects the various components.

The data may be partitioned in such a way that most transactions only access data from a single node. This is the case in the multi-tenancy scenario where one database system is shared across many clients (tenants) and their data typically fits into one node. Additionally, some system data is shared across nodes. Thus, a few transactions require consistent access to more than one node or even the whole database, e.g. for updates to the mentioned system data. Another example for such a partitionable workload is the TPC-C benchmark. In that benchmark, the data can be partitioned (i.e. sharded) by warehouse and most transactions access only data from one warehouse (i.e. one node). Only a few transactions require data from more than one node.

To achieve consistency for those distributed transactions which access data from multiple nodes, the system 100 provides distributed snapshot isolation. The basic idea of snapshot isolation is that every transaction gets its own (virtual) "copy" of the database to work with and therefore is in principle never blocked by concurrent transactions. (Some implementations of snapshot isolation use locking, in which case write transactions may get blocked.) At the end of a transaction, the database allows only transactions to commit if its write set has no conflicts with other concurrent transactions.

The system 100 may support eager replication of data. Lazy replication may be supported in other embodiments.

Embodiments use the central coordinator 106 for certain tasks. Such a central coordinator 106 may be viewed as a single point of failure. To improve fault-tolerance various techniques (e.g. replication) can be applied since the coordinator 106 keeps only a limited amount of state. Furthermore, a central coordinator 106 is also a potential bottleneck. An embodiment is designed to reduce the communication with the coordinator 106 in order to improve performance.

2.2 Preliminaries

We use the following terms to refer to different kinds of transactions: a distributed transaction is a transaction that accesses (reads or writes) data from more than one node. Such a distributed transaction is partitioned into subsets of operations that are executed on the same node. These subsets are not independent, thus the semantics of a transaction applies to the entire set of operations (e.g., if the transaction is aborted, all its operations on all nodes have to be reverted). A local transaction is a transaction that accesses (reads or writes) only data from a single node. A distributed snapshot is a snapshot on multiple nodes, not necessarily on all nodes of a distributed database.

In terms of notation, we use x, y, z for the transactions currently discussed; s, t for transactions that are required to complete the schedule but are not in the focus; and i, j for nodes. $b_x$ represents the begin of transaction x, while $c_x$ represents the commit of transaction x. $w_x(a)$ and $r_x(b)$ represent writes (or reads) of objects a, b by transaction x. A superscript on an operation means that the given operation happens on the specified node, e.g. $b_x^i$ is the begin of transaction x on node i. N(x) contains all nodes accessed by transaction x, i.e. all nodes on which x has accessed an object. SN(x, y) contains all nodes accessed (shared) by both x and y, i.e. SN(x, y)=N(x)∩N(y).

The system 100 implements local snapshot isolation on each node 108, i.e. the schedules produced by the local nodes are correct under snapshot isolation. The implementation of snapshot isolation in a centralized, single-node system has been excessively studied in the past and all major database products already support it. Furthermore we note that aborted transactions do not change the scheduling or the correctness of a snapshot isolation scheme, thus the system may ignore aborts caused by the user or application.

2.3 Definition of Distributed SI

In the following, we extend the existing definition of local snapshot isolation to the distributed setting. The local transactions and the subsets of operations of the distributed transactions accessing data on that node form a local schedule. The correctness of this schedule is enforced by the local node (i.e., local snapshot isolation holds).

Definition 1 (Distributed SI). A set of multiple locally correct schedules is correct under distributed snapshot isolation if and only if there exists an equivalent single schedule that combines all local schedules and that single schedule is correct according to local snapshot isolation.

This definition is similar to what has also been referred to as 1-copy-snapshot-isolation but is not restricted to replicated databases. Note that other definitions in the literature may only refer to operation in a replicated database context.

Note that the equivalent single schedule in Definition 1 is interesting from a theoretical point of view. In some cases the order of certain operations in the local schedules can be changed, e.g. if transaction x does not read or write any object written by transaction y, the begin of transaction x can be either before or after the commit of y, thus there may be more than one equivalent global schedule for a set of local schedules. From a practical point of view, this "freedom" does not help much since it always requires to check the reads-from-relationship, i.e. whether or not a transaction x reads or writes something read or written by transaction y. This relationship may be expensive to monitor, especially in a distributed setting. Thus, the correctness criteria in Subsection 2.5 and the approach presented in Section 3 do not use this freedom and only allow or construct schedules where the local order of the operations is not changed.

2.4 Anomalies in the Distributed Setting

Figure 2:
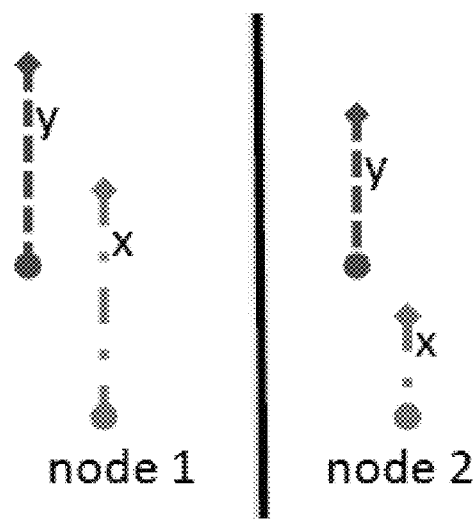
FIG. 2 shows an example of the serial-concurrent pattern anomaly.

One anomaly that can occur when snapshot isolation is applied to a distributed database is the serial-concurrent-pattern. As shown in FIG. 2, the anomaly occurs if a transaction x runs concurrent to another transaction y on node 1 and serial to it on node 2. Therefore, x does not read what y writes on node 1 but does read what y wrote on node 2. This happens if transaction y commits before transaction x starts on node 2. This can lead to inconsistent snapshots read by the same distributed transaction on different nodes. The approach presented in Section 3 will provide mechanisms to avoid such situations.

Another anomaly that can arise in a distributed setting is referred to as the cross-anomaly. In the example shown in FIG. 3, the distributed transaction x ignores the local transaction s on node 1 and reads from the local transaction t on node 2. At the same time, the distributed transaction y reads from transaction s on node 1 and ignores transaction t on node 2. If we combine the two local schedules such that the snapshot for transaction x is consistent, transaction t committed before s since x reads from s but not from t. This means that there exists no consistent snapshot for transaction y that reads from transaction s but not from transaction t since if y reads from s it has to read from all transactions that committed before s (i.e., also from t). The same holds vice-versa if we combine the local schedules such that the snapshot for transaction y is correct.

The anomaly only occurs if the transactions x, y actually read something that transactions s, t write. But as mentioned before, monitoring the reads-from relationship is expensive. Thus, if we want to avoid the cross-anomaly, the system has to make sure that the order of the begin-of-transaction of distributed transactions is the same on all involved nodes. Among the approaches presented in Section 3, only the optimistic and multiple snapshots approaches will allow this anomaly, and the pessimistic approach avoids it.

2.5 Correctness Criteria

The following four rules allow to check whether a set of locally correct schedules is correct according to distributed snapshot isolation (Definition 1):

Rule 1: $c_x^i < c_y^i \rightarrow \forall j \in SN(x, y): c_x^j < c_y^j$
Rule 2: $b_x^i < c_y^i \rightarrow \forall j \in SN(x, y): b_x^j < c_y^j$
Rule 3: $c_x^i < b_y^i \rightarrow \forall j \in SN(x, y): c_x^j < b_y^j$
Rule 4: $b_x^i < b_y^i \rightarrow \forall j \in SN(x, y): b_x^j \leq b_y^j$ SN(x, y) is the set of nodes that both transactions x and y access.

In other words, all begin and commit operations of distributed transactions need to have a total order, in simple words: If one operation (begin or commit) is in a certain order to (i.e. before or after) another operation on one node, the corresponding operations on another node have to be in the same order. (Except if two begin operations are in a certain order on one node, they may also be at the same time on other nodes or in the same order.)

If these four conditions are true for all transactions x, y in the system, a set of local schedules that are correct according to local snapshot isolation is correct according to distributed snapshot isolation. Note that the rules are sufficient but not necessary due to ignoring the freedom from the reads-from-relationship, i.e. there are correct schedules that do not fulfill these rules (especially rule 4 produces many unnecessary rejects). As the experiments show, this does not limit throughput. Alternative solutions take the reads-from relationship into account which is expensive to monitor.

Figure 3:
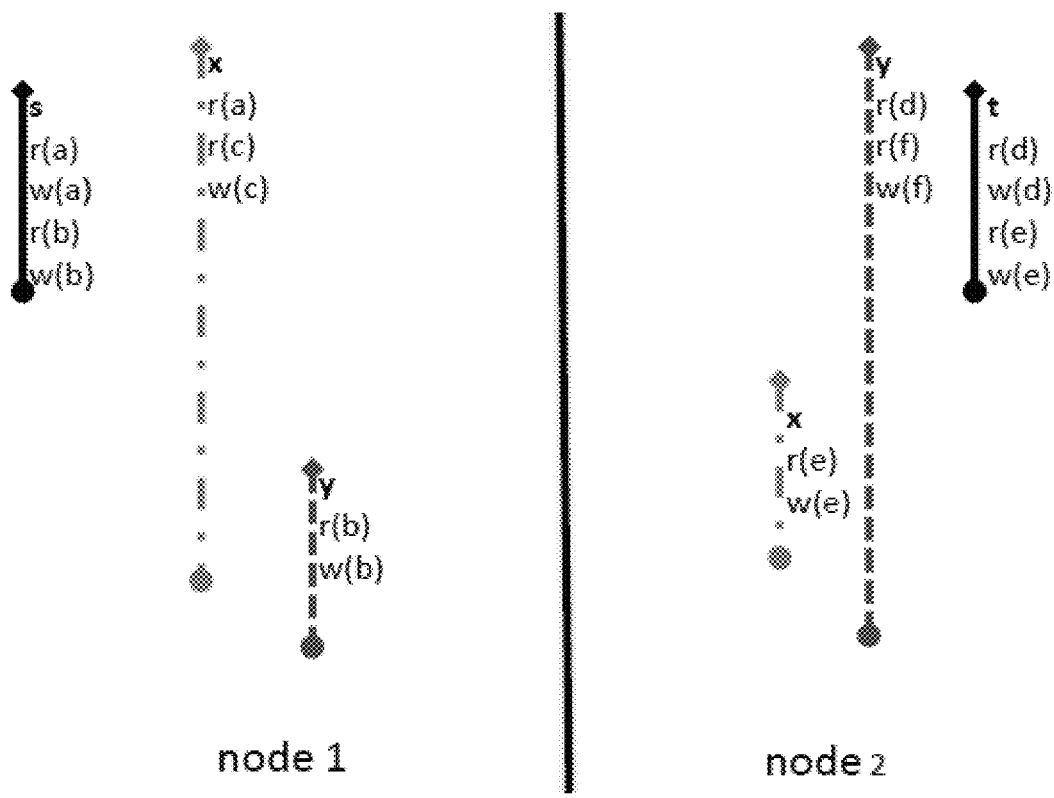
FIG. 3 shows an example of the cross anomaly.

Rule 1 ensures that we can use the commit ID to refer to a snapshot and that snapshot includes all transactions that committed before. Rules 2 and 3 (together with rule 1) ensure that the serial-concurrent-pattern does not occur. Rule 4 avoids the cross-anomaly. As shown in FIG. 3, Rules 1-3 are not sufficient by themselves to guarantee distributed snapshot isolation (Definition 1), so Rule 4 is included.

Proof. We now sketch a proof that the four rules are sufficient to guarantee distributed snapshot isolation. The basic idea is that the begin and commit operations of distributed transactions serve as fix points in the unified schedule. Since they are totally ordered (the four rules imply a total order among all begin and commit operations of distributed transactions), it is always possible to combine them to a single schedule without reordering. The local only operations can then be scheduled between these fix points. Since the local schedules are correct according to local snapshot isolation, the constructed schedule is correct as well because of the partitioning of the data. Local only operations can be scheduled without changing the order among operations from the same node and independently from operations on other nodes because they cannot share a common object (read or write) with a local transaction from another node.

3. Incremental Snapshot Isolation

The incremental approach is a new technique for distributed snapshot isolation. The incremental approach is designed for situations in which most transactions are local and it is not known in advance whether a transaction is local or distributed. The incremental approach overcomes many of the disadvantages of the other approaches, as follows.

The disadvantage of the global approach is that both local and distributed transactions have to contact the central coordinator to get a globally valid snapshot, which is an overhead if a transaction only accesses data from a single node. This overhead limits the performance of the entire system if most of the transactions are only local.

The disadvantage of the pessimistic approach is the required additional a-priori knowledge about the transactions. Thus, the protocol has to be changed in order to enable the application to provide the additional knowledge. Such a change may not be possible in an existing system.

The disadvantage of the optimistic approach is that it does not prevent the cross-anomaly, i.e. it does not provide the same consistency guarantees as the other approaches.

In general, the incremental approach fixes the shortcoming of the optimistic approach, namely the potential occurrence of a cross-anomaly. At the same time we want to achieve similar performance without any a-priori knowledge (i.e., without knowing in advance which transactions will become distributed). In the incremental approach, each node keeps local information required to enforce snapshot isolation locally. The main idea is that a transaction starts locally and can request to access data on other nodes incrementally. Note that the access of data on another node does not immediately provide a transaction with a global snapshot on all nodes of the database. It just triggers the collection of the required information to extend the snapshot to other nodes.

Local transactions can be processed on the corresponding node without contacting the coordinator 106. For distributed transactions, the incremental approach uses an atomic commit protocol (e.g. two phase commit) to coordinate the commits. More specifically, the coordinator 106 generates a global commit identifier to identify the commit of each distributed transaction. The GCID refers to the transaction as a whole, not just the commit itself. More specifically, the GCID is an enumeration of all distributed commits—every distributed transaction that commits gets the next available GCID. This means the GCID is always increasing and there are no gaps (expect in very strange cases when the commit protocol fails).

Figure 4:
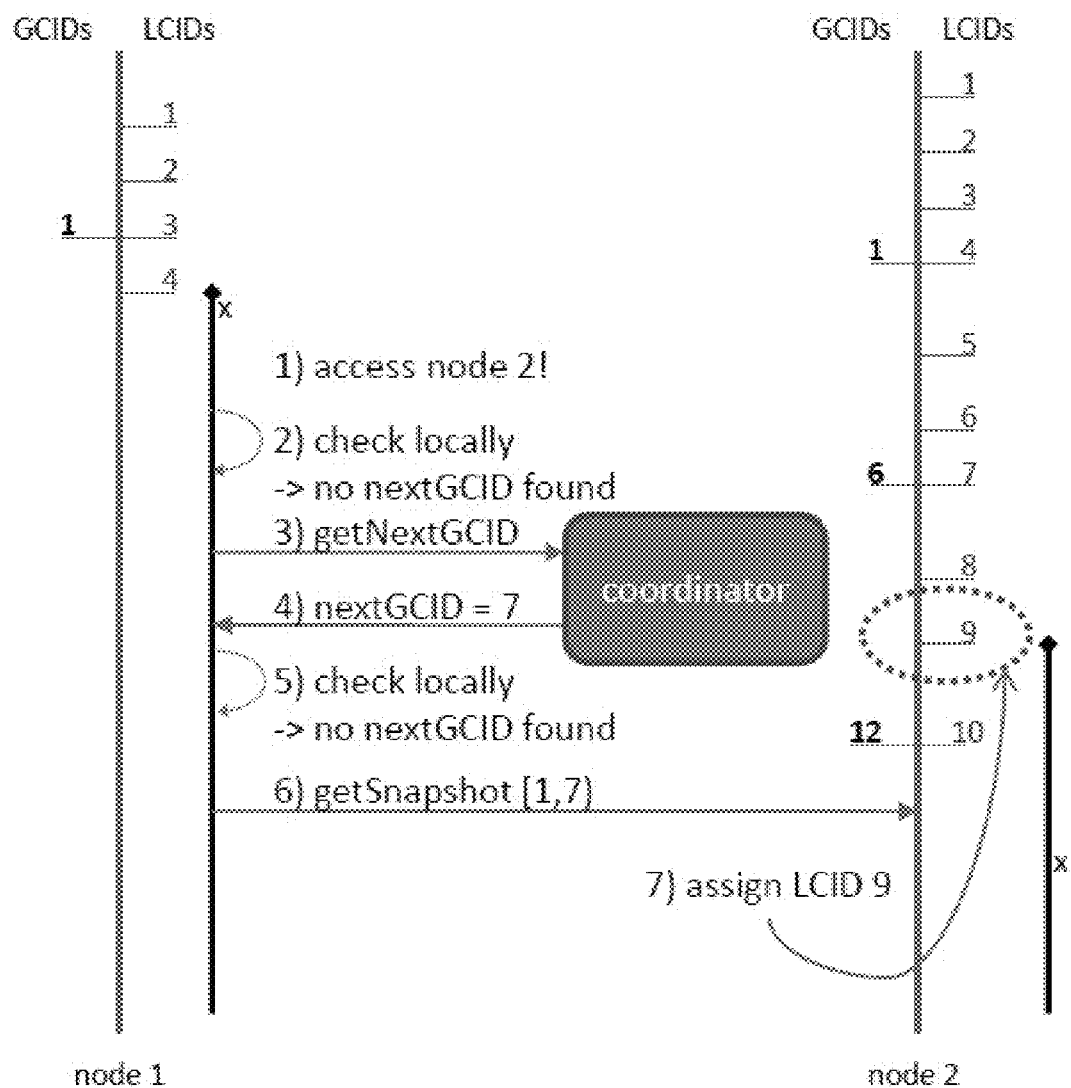
FIG. 4 shows an example of the selection of incremental snapshots.

In addition, the atomic commit protocol serves a second purpose in the incremental approach. The important observation is that the distributed snapshot of a transaction x is defined by the position of its begin-of-transaction within the (ordered) commits of the other distributed transactions. This is similar to local snapshot isolation is implemented in some systems (e.g., Oracle Database 11g Release 2). In essence the commit ID (CID; or system change number, SCN in Oracle) of the last distributed transaction that committed before transaction x begins captures all required information. From another point of view, a transaction x reads from transaction y that committed last before x starts, and ignores transaction z that committed next after y. This defines an interval [y, z) of potential local snapshots that can be considered on other nodes. The information which transaction is ignored is more important to us because in our scenario not all transactions commit on all nodes. In order to get a more recent snapshot, we use the information about what to ignore instead of what to read from. Thus, if a transaction requires access to data from another node it executes the following steps presented in FIG. 4 (GCID stands for global commit ID, LCID for local commit ID).

1. Transaction x requests to access data from node 2.

2. The system 100 calculates the interval [y, z) of snapshots that transaction x may read on other nodes by checking locally whether other distributed transactions committed since transaction x started.

3. If there is no later commit in the system yet, the system asks the central coordinator 106 for the next global commit ID that it will assign. The problem is that the information about the upper end of the interval is usually not available locally when a transaction wants to access data from another node since there is probably no other distributed transaction that committed on that node in the meantime. Thus the system needs some special care to figure out the transaction to be ignored by x.

4. The central coordinator 106 responds with the next global CID that it will assign. The last GCID that the coordinator 106 assigned was 6 (GCIDs 2-5 are omitted from the figure; they were associated with transactions that committed on other nodes), so the coordinator 106 assigns GCID 7.

5. The system 100 checks again locally on node 1 whether there is still no other committed distributed transaction since the system 100 continued normal work during the communication with the coordinator 106.

6. If there is no later commit, x accesses node 2 ignoring the next distributed transaction ID returned by the coordinator 106. If another distributed transaction z committed in the meantime, x ignores that distributed transaction. In the example, the calculated interval is [1,7) since x reads from transaction 1 and no other distributed transaction committed since, thus it uses the response from the coordinator 106.

7. As snapshot for transaction x on node 2 the system 100 uses the most recent snapshot that ignores transaction 7, which in this case is what local transaction 9 wrote. (Note that GCID 7 is itself not shown because it is associated with a transaction that committed on another node.) Since node 2 associates GCID 12 with LCID 10, it uses a snapshot earlier than LCID 10; the snapshot associated with LCID 9 is the closest one earlier than LCID 10, so using that one may result in better performance than choosing the snapshots associated with LCIDs 7 or 8. More details on how exactly the local snapshot is selected follow below.

Since the commits of all distributed transactions are centrally coordinated (to ensure rule 1 holds), it is no overhead to produce a globally valid CID. Using the interval [y, z) described above and a mapping between global and local transaction identifiers, the system 100 can incrementally add more nodes to a transaction by constructing a local snapshot for transaction x (Step 6 in FIG. 4). If the local mechanisms are adapted or the local snapshot is constructed such that the local node behaves as if the transaction really started at the calculated point in the schedule, the system 100 can ensure local snapshot isolation. Furthermore the system 100 assigns the most recent snapshot to a transaction that is possible within the interval to ensure that the same snapshot is selected on all nodes 108.

As discussed above, a GCID is issued when a distributed transaction commits successfully (i.e. when all nodes agreed to commit and the coordinator 106 decided to commit). The example of FIG. 4 omits the other nodes on which other distributed transactions committed in order to increase the GCID. This illustrates that the system 100 implements the incremental approach to select the appropriate snapshot to use, since if only two nodes are involved and nothing else is going on, the problem is trivial.

The incremental technique can be implemented in different variants depending on how exactly the local snapshot is selected. In the following, we describe one variant, called first select in detail.

3.1 First Select

The main idea of the first select approach is that the system 100 allows only one local snapshot between two commits of distributed transactions to be used by other distributed transactions. Thus, if the distributed transactions x, y, and z execute on the same node i, and y reads from x and ignores z that uniquely defines its local snapshot on all other nodes. It is not required that the local snapshot used for this is exactly the snapshot produced by x. There are two reasons for this: a) a distributed transaction may not have accessed all nodes, thus the local part of the distributed snapshot is undefined for those nodes, and b) as long as we can ensure that the begins of distributed transactions are in the same order on every node, we have some freedom in considering local only transactions in the snapshot, i.e. although the snapshot is uniquely defined on a global level, the local implementation can be constructed incrementally.

Figure 5A:
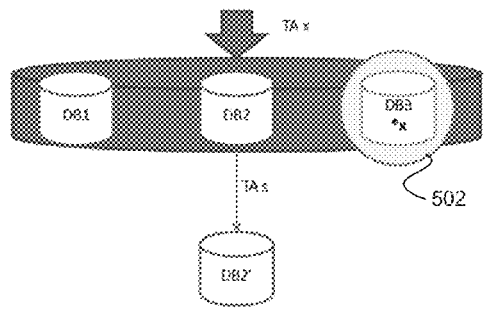
FIGS. 5A-5D show examples of the first select approach.

Thus, if a transaction y wants to access data from another node, it executes the following steps as presented in FIGS. 5A-5D:

FIG. 5A: Transaction y calculates its distributed snapshot by calculating the interval [x, z) as above and designates its own snapshot as the one after x on node 3. In the figure, the circle 502 represents the snapshot and *x stands for the designated or tagged snapshot.

Figure 5B:
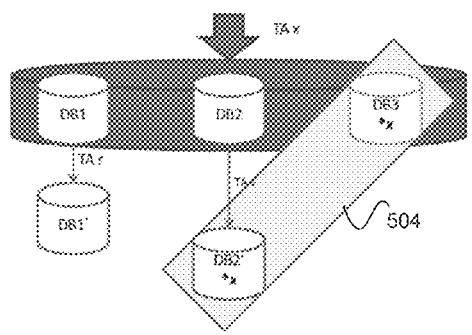

FIG. 5B: With that information the system constructs the snapshot for transaction y on node 2 as follows:

if there exists a local snapshot that was designated as the local part of the distributed snapshot z−1 (the distributed transaction that committed before z), y uses that snapshot if there is no such snapshot, the system designates the snapshot produced by the latest local transaction that committed before z as the one after x. In the figure, the area 504 is extended to node 2 and the corresponding state of the database is tagged with *x.

if there is no commit of transaction z on node 2 we take the latest local snapshot right before the commit of the next distributed transaction on node 2 or the most recent snapshot if no other distributed transaction committed on node 2 since. This is still a snapshot ignoring z since the distributed commits are totally ordered and therefore the system knows that z did not access node 2.

Figure 5C:
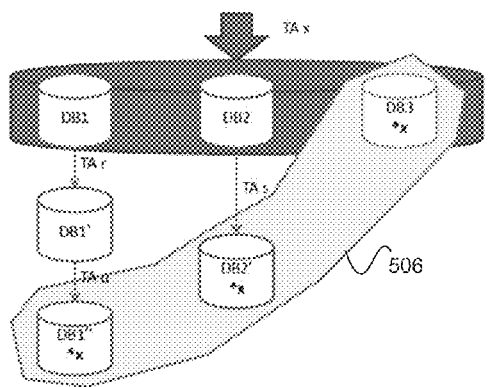

FIG. 5C: The system can incrementally add more nodes to the transaction, e.g. transaction y can extend its snapshot on node 1 (bigger area 506 and tag in the figure).

Figure 5D:
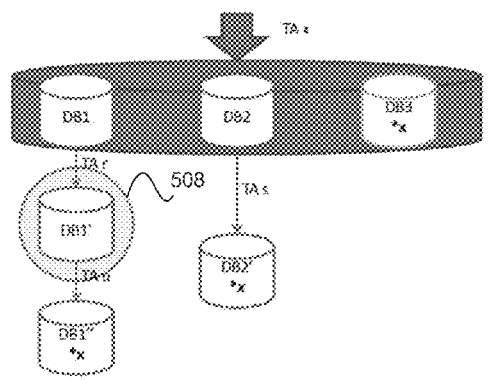

FIG. 5D: Note that a local transaction may only access data from another node if its local snapshot matches the designated snapshot on its original node or if its snapshot can be promoted to be that designated snapshot. Thus the transaction with the shown snapshot (circle 508) in FIG. 5D cannot access data from another node since it does not use the designated snapshot tagged with *x.

As the name of the approach says, only the first transaction that starts between two distributed commits can select a snapshot. If this is not possible, the operation fails (the transaction can still continue on the local node, but it must not access other nodes). To understand the reason for this restriction, consider the following example: if we would allow a transaction x from node i that has a different snapshot than the designated one to access data from another node, its begin of transaction is different than all begins of other distributed transactions on node i (for the sake of presentation, assume it is earlier) but equal on all other nodes. If now another transaction y is allowed to do the same on a different node j and later x accesses j (i.e. $b_y^j < b_x^j$) and y accesses i (i.e. $b_x^i < b_y^i$), the begins are not ordered the same.

Of course this is very restrictive but monitoring which node a transaction may access or not is expensive. If the transaction informs the system on its begin that it wants to access data from another node, the system can ensure that this is possible by assigning the designated snapshot to the transaction.

The first select approach enforces the four rules established in Subsection 2.5 as follows: Rule 1 is enforced by centrally coordinating all distributed commits. Rules 2 and 3 are enforced by providing transaction x on every node it accesses with a snapshot that exactly includes all distributed transactions that x read on any other nodes (based on the interval and the rule that always the most recent snapshot within the interval is selected). Rule 4 is enforced by restricting the possible choices of snapshots on each node to a single snapshot for every interval between two consecutive distributed transactions. Thus every transaction that started between the same two distributed commits will also use the same snapshot on all nodes.

The first select approach may be viewed as an improvement over the pessimistic approach. It has the same guarantees but occasionally provides more recent snapshots. Instead of selecting all snapshots at the beginning of the transaction, the snapshots are constructed incrementally. Therefore we can consider some local transactions on other nodes that committed while the transaction was working on its first node. Furthermore, this approach does not require any a-priori knowledge since the snapshot is constructed incrementally. Knowing whether a transaction will eventually access data from other nodes may reduce the abort rate but is not a requirement.

A noteworthy advantage of the incremental (first select) approach is that only distributed transactions need to be coordinated and no knowledge about the transaction is required beforehand, i.e. local transactions can upgrade to distributed transactions. The incremental approach can be implemented transparently to the application. The disadvantage is that the approach is rather complex and requires some changes to the underlying database.

3.2 Discussion and Comparisons

The main difference between the global, pessimistic, optimistic and incremental approaches is the a-priori knowledge about the transaction required. The pessimistic approach needs precise knowledge about the set of nodes accessed before the transaction starts (or has to assume a safe superset or abort the transaction if a node is accessed that was not in the initial set of nodes). The optimistic approach benefits from the information whether a transaction is going to be distributed or local. The incremental approach does not require any knowledge about the transaction in advance.

In terms of guarantees, the optimistic approach provides a lower level of consistency than the other approaches, namely not preventing against the cross-anomaly.

Finally, the approaches differ in their support for point-in-time recovery. Normal recovery is possible with all approaches but accessing the state of the distributed database at a specific point in time is more difficult if the nodes of the database run independently. With the global approach, the globally unique CIDs assigned to all transactions can be used for point-in-time recovery. In the optimistic approach, there is no consistent view of the distributed database, thus point-in-time recovery is always fuzzy. In the pessimistic and incremental approaches, point-in-time recovery is possible to commits of distributed transactions. With incremental this comes almost for free, since the system issues global CIDs for distributed transactions anyway. In any case, the snapshot is only defined for those nodes that participated in the distributed transaction. Thus complete point-in-time recovery is only possible to commits of distributed transactions that involved all nodes.

The system 100 uses a freedom similar to Elnikety's generalized snapshot isolation by placing the begin of transaction where it is suitable instead of where the first operation takes place. But as opposed to Elnikety's generalized snapshot isolation where the begin may only be earlier, the system 100 also allows the begin of transaction to be later (in terms of wall clock time) to ensure the most recent possible snapshot that does not break the restrictions.

The system 100 uses an implementation similar to Daudjee's session snapshot isolation by providing every transaction with the most recent snapshot that is still consistent. In some cases this can even be a more recent snapshot than what the definition of strong snapshot isolation in Daudjee would allow since the system can consider local only transactions as long as they do not break global consistency.

An embodiment of the system 100 is organized as a column store. However as compared to Zhang 1 and Zhang 2 which use a global approach, the system 100 uses the incremental approach.

In contrast to Schenkel, an embodiment of the system 100 considers local transactions on one node as well as distributed transactions over more than one node. Optimizing for local transactions is important in certain embodiments.

A noteworthy difference of the system 100, especially as compared to systems that use snapshot isolation-based replicas, but which achieves a higher isolation level in the overall system, is that we minimize the information about the transactions shipped between nodes (e.g. read- or write-sets). This is a noteworthy design decision in our system, thus we cannot achieve a higher isolation level than what the underlying systems provide.

4. Example Configuration

Figure 6:
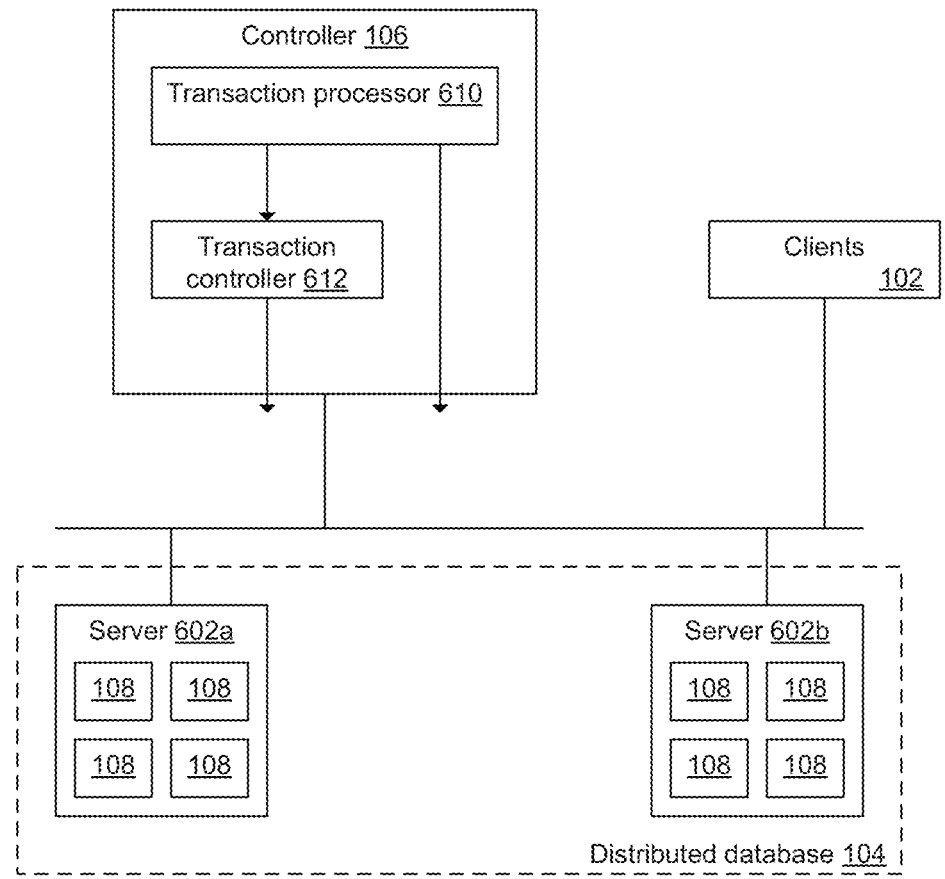
FIG. 6 is a block diagram of an example system for incremental snapshot isolation.

FIG. 6 shows an example setup for the system 100. The system 100 uses 8 instances (nodes 108) of a database running on two servers 602a and 602b, each with 32 cores and 256 GB main memory (i.e. four instances share one machine) as distributed database 104. Each instance runs independently from the others locally enforcing snapshot isolation. Another server with 8 cores and 16 GB of main memory is used as the driver (coordinator) machine 106, which includes the required transaction coordination facilities. The coordination of the transactions is centralized on that machine and implemented using normal OS locks. The database is populated with 8 warehouses and partitioned by warehouse (i.e. one warehouse per instance). The number of terminals (clients 102) is fixed to 32. More precisely, a terminal is a system on which clients enter their requests, one client at a time.

More specifically, the controller 106 includes a transaction processor 610 and a transaction coordinator 612. The transaction processor 610 processes transactions, for example as a result of users interacting with client machines that provide an interface to application servers that execute applications using the distributed database 104. Transactions may occur due to user actions (create order, cancel order, etc.), due to system requests (processing order delivery, new stock entering the system, etc.), etc. The transaction processor 610 routes local transactions to the respective nodes and routes global transactions (that access more than one node) to the transaction coordinator 612. The transaction coordinator 612 performs the transaction coordination processing described above (generating GCIDs, FIG. 4 and related text, etc.).

Figure 7:
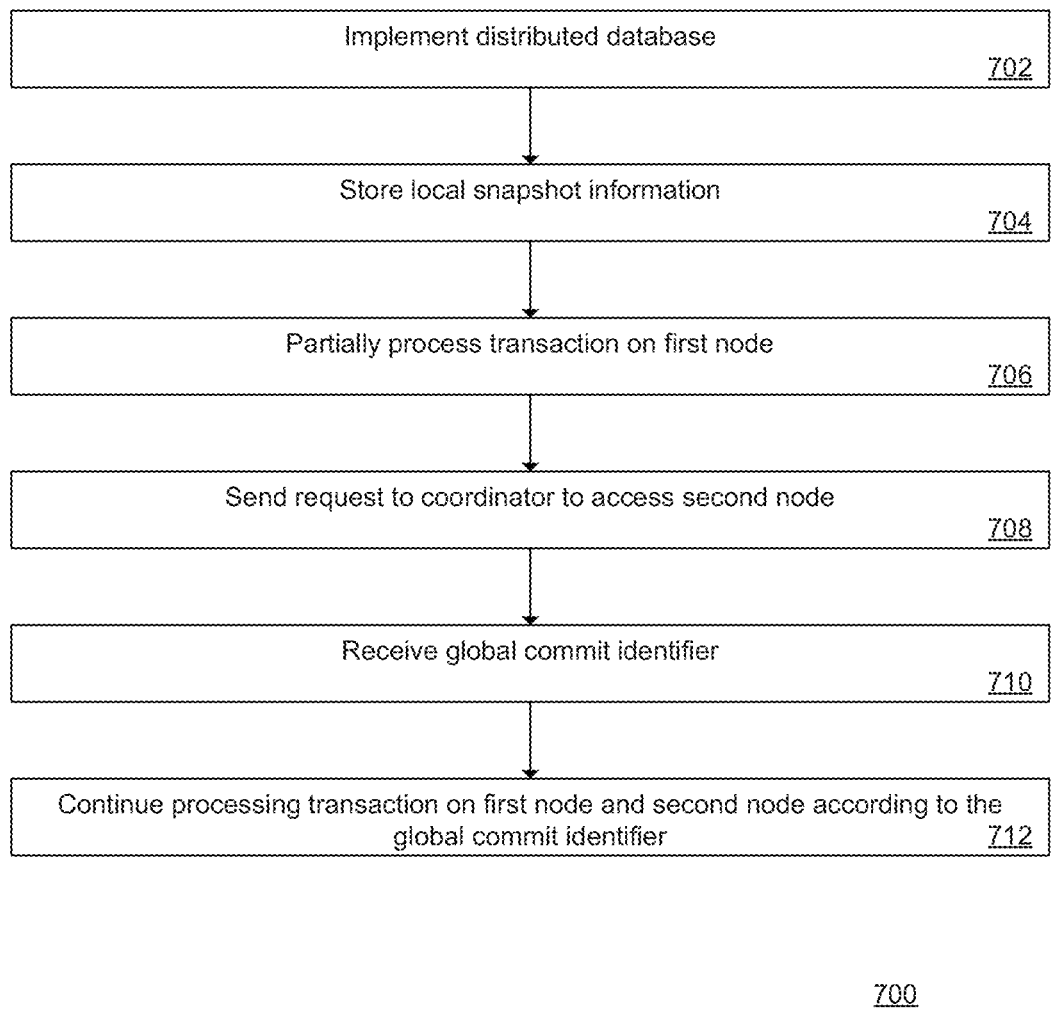
FIG. 7 is a flowchart of a method of performing snapshot isolation in distributed databases.

FIG. 7 is a flowchart of a method 700 of performing snapshot isolation in distributed databases. The method 700 may be performed by the system 100 (see FIG. 1, FIG. 6, etc.), for example as controlled by one or more computer programs.

At 702, a number of hardware devices implement a number of nodes that implement a distributed database. For example, the servers 602a and 602b implement the nodes 108 that implement the distributed database 104.

At 704, the nodes store local snapshot information. For a particular node a corresponding local snapshot information enforces snapshot isolation for that particular node. For example, each of the nodes 108 store their own corresponding local snapshot information. See also FIGS. 5A-5D.

At 706, a first node partially processes a transaction. For example, in FIG. 4 node 1 is partially processing transaction x at LCID 4.

At 708, the first node sends, to a hardware coordinator, a request to access a second node. For example, in FIG. 4 node 1 sends to the coordinator 106 a request to access node 2.

At 710, the first node receives, from the hardware coordinator, a global commit identifier. For example, in FIG. 4 node 1 receives from the coordinator 106 the GCID 7.

At 712, the first node and the second node continue to process the transaction in accordance with the global commit identifier. For example, in FIG. 4 node 1 uses the GCID 7 to check whether there was no other committed distributed transaction, and node 2 uses the GCID 7 to select the snapshot corresponding to LCID 9, for processing transaction x.

Additionally, note that not only the information from the global coordinator 106 but also local circumstances can influence the GCID that is used to restore the snapshot on other nodes. For example, if another transaction has committed on node 1 since x started, it is not necessary to contact the coordinator 106; it is sufficient to use the GCID of that transaction as information. (This case is less frequent as compared to the case described above for contacting the coordinator.)

FIG. 8 is a block diagram of an example computer system and network 2400 for implementing embodiments of the present invention. Computer system 2410 includes a bus 2405 or other communication mechanism for communicating information, and a processor 2401 coupled with bus 2405 for processing information. Computer system 2410 also includes a memory 2402 coupled to bus 2405 for storing information and instructions to be executed by processor 2401, including information and instructions for performing the techniques described above. This memory may also be used for storing temporary variables or other intermediate information during execution of instructions to be executed by processor 2401. Possible implementations of this memory may be, but are not limited to, random access memory (RAM), read only memory (ROM) (when not storing temporary variables or other intermediate information), or both. A storage device 2403 is also provided for storing information and instructions. Common forms of storage devices include, for example, a hard drive, a magnetic disk, an optical disk, a CD-ROM, a DVD, a flash memory, a USB memory card, a solid state drive, or any other medium from which a computer can read. Storage device 2403 may store source code, binary code, or software files for performing the techniques or embodying the constructs above, for example.

Computer system 2410 may be coupled via bus 2405 to a display 2412, such as a cathode ray tube (CRT) or liquid crystal display (LCD), for displaying information to a computer user. An input device 2411 such as a keyboard and/or mouse is coupled to bus 2405 for communicating information and command selections from the user to processor 2401. The combination of these components allows the user to communicate with the system. In some systems, bus 2405 may be divided into multiple specialized buses.

Computer system 2410 also includes a network interface 2404 coupled with bus 2405. Network interface 2404 may provide two-way data communication between computer system 2410 and the local network 2420. The network interface 2404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 2404 sends and receives electrical, electromagnetic, or optical signals that carry digital data streams representing various types of information.

Computer system 2410 can send and receive information, including messages or other interface actions, through the network interface 2404 to an Intranet or the Internet 2430. In the Internet example, software components or services may reside on multiple different computer systems 2410 or servers 2431, 2432, 2433, 2434 and 2435 across the network. A server 2431 may transmit actions or messages from one component, through Internet 2430, local network 2420, and network interface 2404 to a component on computer system 2410.

The computer system and network 2400 may be configured in a client server manner. For example, the computer system 2410 may implement a server. The client 2415 may include components similar to those of the computer system 2410.

More specifically, as described above, the computer system 2410 may implement the controller 106 (see FIG. 1); the servers 2431 and 2432 may implement the distributed database; and the client 2415 may be one of the clients 102. The internet 2430 may be another local network.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of performing snapshot isolation in distributed databases, comprising:
    implementing, on a plurality of hardware devices, a plurality of nodes that implement a distributed database;
    storing, by the plurality of nodes, a plurality of local snapshot information, wherein for a particular node a corresponding local snapshot information enforces snapshot isolation for the particular node;
    partially processing, by a first node of the plurality of nodes, a transaction, wherein the first node has no a-priori knowledge that the transaction is a distributed transaction;
    determining, by the first node, that the transaction requires access to data from a second node and is the distributed transaction;
    sending, by the first node to a hardware coordinator, a request to access a second node of the plurality of nodes;
    receiving, by the first node from the hardware coordinator, a global commit identifier; and
    continuing to process the distributed transaction, by the first node and the second node, in accordance with the global commit identifier, wherein continuing to process the distributed transaction includes:
        checking, by the first node, that another distributed transaction has not committed;
        transmitting, from the first node to the second node, the global commit identifier; and
        processing the distributed transaction, by the second node, according to a snapshot of the plurality of local snapshot information on the second node that was made prior to the global commit identifier.

2. The computer-implemented method of claim 1, wherein one of the plurality of hardware devices is configured to implement at least two of the plurality of nodes.

3. The computer-implemented method of claim 1, wherein one of the plurality of hardware devices is configured to implement one of the plurality of nodes.

4. The computer-implemented method of claim 1, wherein each of the plurality of nodes stores a different part of the distributed database.

5. The computer-implemented method of claim 1, wherein the global commit identifier is one of a plurality of global commit identifiers, wherein each one of the plurality of global commit identifiers identifies a commit of each one of a plurality of distributed transactions.

6. The computer-implemented method of claim 1, further comprising:
    generating, by the hardware coordinator, the global commit identifier.

7. The computer-implemented method of claim 1, further comprising:
    generating, by the hardware coordinator, the global commit identifier when one of a plurality of distributed transactions commits successfully.

8. The computer-implemented method of claim 1, wherein the global commit identifier is one of a plurality of global commit identifiers, further comprising:
    generating, by the hardware coordinator, the plurality of global commit identifiers when a plurality of distributed transactions commits successfully.

9. The computer-implemented method of claim 1, further comprising:
    checking, by the first node, that another distributed transaction has not committed, prior to sending the request.

10. The computer-implemented method of claim 1, further comprising:
    checking, by the first node, that another distributed transaction has not committed, prior to continuing to process the distributed transaction.

11. The computer-implemented method of claim 1, wherein the plurality of local snapshot information corresponds to a plurality of snapshots of the distributed database on the plurality of nodes.

12. The computer-implemented method of claim 1, wherein the plurality of local snapshot information corresponds to a plurality of snapshots of the distributed database that are created incrementally on the plurality of nodes.

13. A system for performing snapshot isolation in distributed databases, comprising:
- a plurality of hardware devices that are configured to implement a plurality of nodes that implement a distributed database; and
- a hardware coordinator that is configured to generate a global commit identifier,
- wherein the plurality of nodes are configured to store a plurality of local snapshot information, wherein for a particular node a corresponding local snapshot information enforces snapshot isolation for the particular node,
- wherein a first node of the plurality of nodes is configured to partially process a transaction, wherein the first node has no a-priori knowledge that the transaction is a distributed transaction;
- wherein the first node is configured to determine that the transaction requires access to data from a second node and is the distributed transaction;
- wherein the first node is configured to send, to the hardware coordinator, a request to access a second node of the plurality of nodes,
- wherein the first node is configured to receive, from the hardware coordinator, the global commit identifier, and
- wherein the first node and the second node are configured to continue to process the distributed transaction in accordance with the global commit identifier, wherein continuing to process the distributed transaction includes:
  - checking, by the first node, that another distributed transaction has not committed;
  - transmitting, from the first node to the second node, the global commit identifier; and
  - processing the distributed transaction, by the second node, according to a snapshot of the plurality of local snapshot information on the second node that was made prior to the global commit identifier.

14. The system of claim 13, wherein the hardware coordinator comprises:
- a transaction controller that is configured to generate the global commit identifier; and
- a transaction processor that is configured to route a local transaction to one of the plurality of nodes, and to route the distributed transaction to the transaction controller.

15. The system of claim 13, wherein the global commit identifier is one of a plurality of global commit identifiers, wherein each one of the plurality of global commit identifiers identifies a commit of each one of a plurality of distributed transactions.

16. The system of claim 13, wherein the plurality of local snapshot information corresponds to a plurality of snapshots of the distributed database on the plurality of nodes.

17. The system of claim 13, wherein the first node is configured to check that another distributed transaction has not committed;
- wherein the first node is configured to transmit, to the second node, the global commit identifier; and
- wherein the second node is configured to process the distributed transaction according to a snapshot of the plurality of local snapshot information on the second node that was made prior to the global commit identifier.

18. A non-transitory computer readable medium storing instructions to control a computer system for performing snapshot isolation in distributed databases, comprising:
- a distributed database component that is configured to control a plurality of hardware devices to implement a distributed database on a plurality of nodes; and
- a coordinator component that is configured to control a hardware coordinator to generate a global commit identifier,
- wherein the distributed database component is configured to control the plurality of nodes to store a plurality of local snapshot information, wherein for a particular node a corresponding local snapshot information enforces snapshot isolation for the particular node,
- wherein the distributed database component is configured to control a first node of the plurality of nodes to partially process a transaction, wherein the first node has no a-priori knowledge that the transaction is a distributed transaction,
- wherein the distributed database component is configured to control the first node to determine that the transaction requires access to data from a second node and is the distributed transaction;
- wherein the distributed database component is configured to control the first node to send, to the hardware coordinator, a request to access a second node of the plurality of nodes,
- wherein the distributed database component is configured to control the first node to receive, from the hardware coordinator, the global commit identifier, and
- wherein the distributed database component is configured to control the first node and the second node to continue to process the distributed transaction in accordance with the global commit identifier, wherein continuing to process the distributed transaction includes:
  - checking, by the first node, that another distributed transaction has not committed;
  - transmitting, from the first node to the second node, the global commit identifier; and
  - processing the distributed transaction, by the second node, according to a snapshot of the plurality of local snapshot information on the second node that was made prior to the global commit identifier.

19. The non-transitory computer readable medium of claim 18, wherein the coordinator component comprises:
- a transaction controller component that is configured to control the hardware coordinator to generate the global commit identifier; and
- a transaction processor component that is configured to control the hardware coordinator to route a local transaction to one of the plurality of nodes, and to route the distributed transaction to the transaction controller.

* * * * *